UNITED STATES PATENT OFFICE.

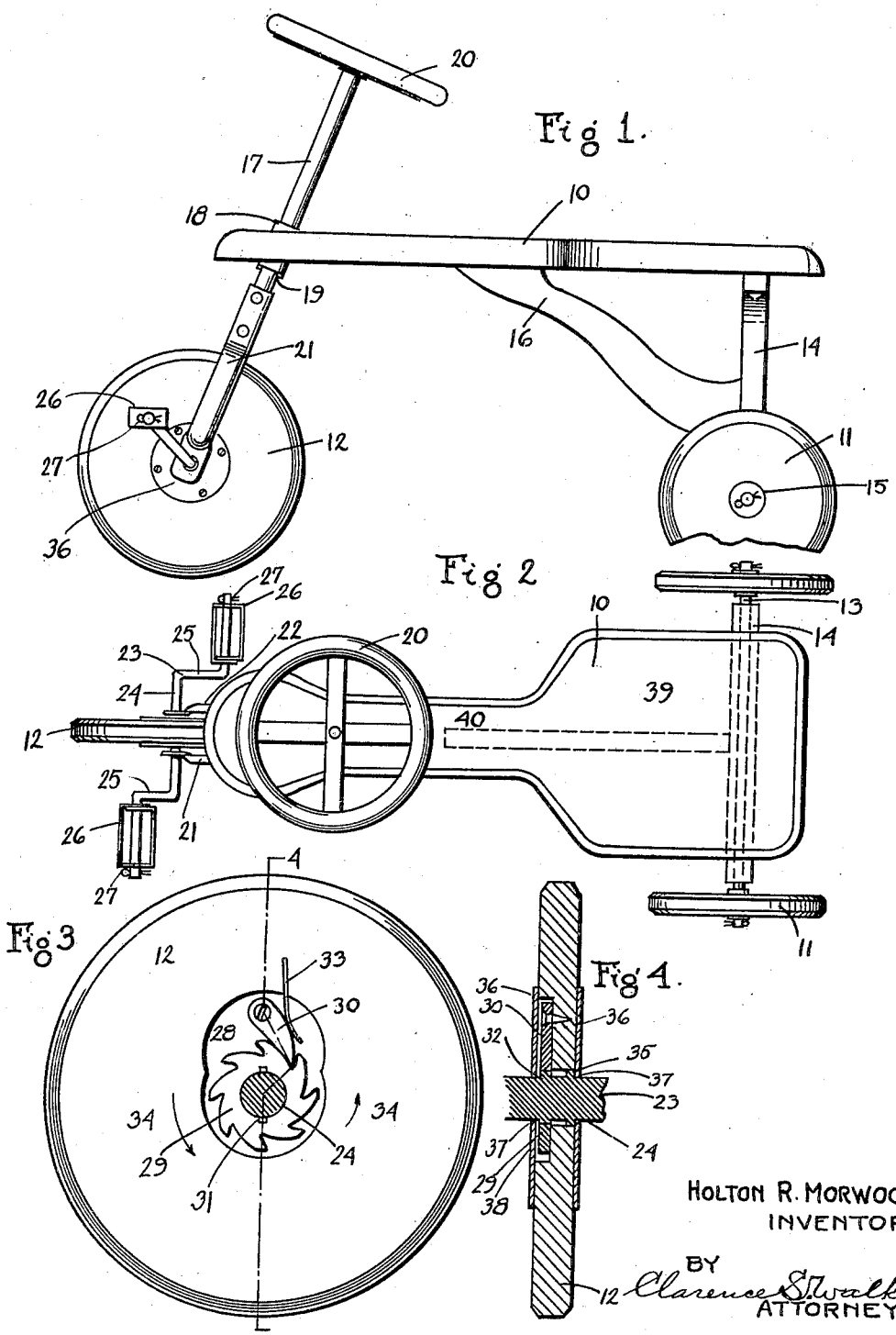

HOLTON R. MORWOOD, OF WELLAND, ONTARIO, CANADA.

VEHICLE.

1,397,174.  Specification of Letters Patent.  Patented Nov. 15, 1921.

Application filed January 14, 1921. Serial No. 437,292.

*To all whom it may concern:*

Be it known that I, HOLTON R. MORWOOD, a subject of the King of England, residing at Welland, in the Province of Ontario and Dominion of Canada, have invented certain new and useful Improvements in Vehicles, of which the following is a specification.

This invention relates to an improvement in vehicles and particularly to vehicles of the three wheel type on which a child sits and propels himself by pedals actuating the front wheel.

The object of this invention is to provide a vehicle which can be impelled forward by means of pedals through mechanism that allows the vehicle to coact without requiring the child to remove his feet from the pedals.

Other objects will appear from an examination of the specification and the drawings which form a part thereof and in which—

Figure 1 is a side elevation of one embodiment of this invention;

Fig. 2 is a top plan view of the same embodiment;

Fig. 3 is an enlarged side elevation of the front wheel of the vehicle; and

Fig. 4 is a section of the wheel taken along the line 4—4 of Fig. 3.

Referring to the drawings the reference character 10 is used to designate the body plate or seat which is supported by the rear wheels 11 and the front wheel 12. The rear wheels 11 are rotatably mounted on an axle shaft 13 fixed to a bolster block 14 on the under side of the body plate. Cotter pins 15 or other suitable means may be used to hold the wheels in place. A brace arm 16 fixed to the body plate 10 and the block 14 further secures the block in the upright position shown in Fig. 1 and reinforces it against bending strains.

The front wheel 12 is carried by the steering post 17 journaled in a bearing sleeve 18 which extends through the body plate at an angle other than a right angle. Bosses 19 on the post 17 support the sleeve 18 and the body plate in the required position. At the upper end of the post 17 is a steering wheel 20 and fixed to the lower end are arms 21, and 22 which act as forks and are positioned at each side of the front wheel 12.

Journaled in the fork arms 21, 22, is an axle 23 having an intermediate right line portion 24 which extends through the plates and on which the front wheel is mounted. At each end of the portion 24 are formed crank arms 25 which carry the pedals 26. The pedals 26 are held in place by cotter pins 27 so that the pedals can be removed to permit assemblage of the parts, the entire axle being made of a single piece.

On one side of the wheel 12 is provided a recess 28 preferably having the contour of a figure 8 as shown in Fig. 3. In this recess 28 is a ratchet wheel 29 carried on the axle 23 and a dog or pawl 30 pivotally fixed to the wheel. Recesses 31 are formed in the ratchet wheel 29 into which projections 32 on the axle 23 fit when the parts are assembled so that the ratchet wheel rotates with the axle and through the pawl 30 drives the wheel 12.

A spring 33, one end of which is embedded in the front wheel holds the pawl normally in engagement with the ratchet wheel but allows the front wheel to rotate independently of the ratchet wheel and axle when the axle is held at rest and the wheel continues to rotate in the direction indicated by the arrows 34, on Fig. 3.

Projections 35, similar to the projections 32, are formed on the axle at such a distance from them that both are within the limits of the wheel 12. Fastened to each side of the wheel 12 are annular plates 36, each having a center aperture 37 through which the axle 23 extends. These plates coöperate with the projections 32 and 35 to hold the wheel at the center of the axle and support the wheel independently of the ratchet wheel 29 and the pawl 30. This construction is necessary because the diameter of the hole 38 through the center of the wheel must be larger than the axle diameter to allow the projections 32 and 35 to pass through it when the parts are being assembled.

The body plate 10 is comparatively broad at the rear to provide a seat section 39 and comparatively narrow at 40 in front of the seat section so that it can be straddled by a child sitting on the seat section without interfering with the movement of the child's legs when operating the pedals.

In assembling the front wheel parts the ratchet wheel 29 is first slipped over one end of the axle, which is made of a single piece, onto the portion 24. The wheel 12 is now slipped over the other end of the axle onto the portion 24 between the projections 32 and 35 with the recess 28 adjacent the ratchet wheel 29, and the ratchet wheel is forced into engagement with the projections 32 which lie within the recess, so that the ratchet wheel is also in the recess in mesh with the pawl 30. The annular plates 36 are now slipped over the ends of the axle and fastened to the sides of the front wheel by the screws or other suitable means. The axle and front wheel are thus fixed in the assembled relations as shown in Fig. 4. The fork arms 21, 22 are then slipped over the ends of the axle and fastened to the lower end of the steering post 17 which is mounted in the body plate, and the pedals 26 are fixed on the ends of the axle by the pins 27.

While one embodiment only of this invention has been shown and described, it is obvious that others can be made without departing from the spirit and scope of the invention as set forth in the following claims.

Having thus disclosed my invention what I claim as new and for which I desire the protection of Letters Patent is:

1. In a vehicle, the combination with a pedal actuated front wheel having a transverse passage through the center and a recess in one side into which one end of said passage opens, of a front axle, the portion in said passage being provided with projections and the diameter of the passage being such that the wheel turns freely around the axle with its projections, a ratchet wheel in said recess engaged by certain of said projections to rotate with said axle, a spring pressed pawl in said recess bearing against said ratchet wheel, and plates having openings for said axle fixed to the sides of said wheel to support the axle independent of the passage through the wheel and of the ratchet and pawl mechanism.

2. In a vehicle, the combination with a pedal actuated front wheel having a transverse passage through its center and a recess in one side into which one end of said passage opens, of a front axle in said passage having two sets of projections, one in said recess and the other adjacent the end of the passage away from said recess, the diameter of the passage being such that the wheel may be turned freely around the axle and its projections, a ratchet wheel in said recess mounted on said axle and caused by the projections within the recess to rotate with the axle, a spring pressed pawl pivoted to said wheel inside said recess and bearing against said ratchet wheel and plates having openings for said axle fixed to the sides of said wheel to support the axle independently of the passage through the wheel and of the ratchet and pawl mechanism, one of said plates sealing said recess and the other being normally in contact with the projections on said axle within said passage.

In testimony whereof I affix my signature.

HOLTON R. MORWOOD.